US012496851B1

(12) United States Patent
Williams et al.

(10) Patent No.: US 12,496,851 B1
(45) Date of Patent: Dec. 16, 2025

(54) FRONT HUB WITH TIRE BALANCER FOR SPRINT CARS

(71) Applicant: CRW DESIGNS AND MACHINING, Anaheim, CA (US)

(72) Inventors: Cody Williams, Norco, CA (US); Rodney Williams, Yorba Linda, CA (US)

(73) Assignee: CRW DESIGNS AND MACHINING, Anaheim, CA (US)

( * ) Notice: Subject to any disclaimer, the term of this patent is extended or adjusted under 35 U.S.C. 154(b) by 0 days.

(21) Appl. No.: 19/049,919

(22) Filed: Feb. 10, 2025

(51) Int. Cl.
*B60B 27/00* (2006.01)

(52) U.S. Cl.
CPC ...... *B60B 27/0047* (2013.01); *B60B 27/0005* (2013.01); *B60B 2320/30* (2013.01)

(58) Field of Classification Search
CPC .............. B60B 27/0005; B60B 27/001; B60B 27/0047; B60B 2320/30; B60B 15/28; B60B 19/06
See application file for complete search history.

(56) References Cited

U.S. PATENT DOCUMENTS

| | | | | |
|---|---|---|---|---|
| 3,316,021 A * | 4/1967 | Salathiel | ................. | G01M 1/28 301/5.22 |
| 3,346,303 A * | 10/1967 | Wesley | ................ | F16F 15/363 301/5.22 |
| 3,897,977 A * | 8/1975 | DE Meurisse | .......... | G01M 1/28 301/5.22 |
| 5,142,936 A * | 9/1992 | McGale | ................ | F16F 15/363 301/5.22 |
| 5,503,464 A * | 4/1996 | Collura | ................. | F16F 15/366 301/5.22 |

FOREIGN PATENT DOCUMENTS

KR         20100068684 A    *    6/2010             B60B 15/28

OTHER PUBLICATIONS

Machine Translation of KR 20100068684 A, 6 pages (Year: 2010).*

* cited by examiner

*Primary Examiner* — S. Joseph Morano
*Assistant Examiner* — Emily G. Castonguay
(74) *Attorney, Agent, or Firm* — Knobbe, Martens, Olson & Bear, LLP

(57) ABSTRACT

A balancer hub assembly for a sprint car. The balancer hub assembly includes an hub having a groove; a cap having a groove and removably couplable to the hub. The groove of the hub and the groove of the cap form a chamber when the hub and the cap are coupled to each other. The balancer hub assembly can include a plurality of ball bearing (BB) pellets and oil positioned inside the chamber.

20 Claims, 18 Drawing Sheets

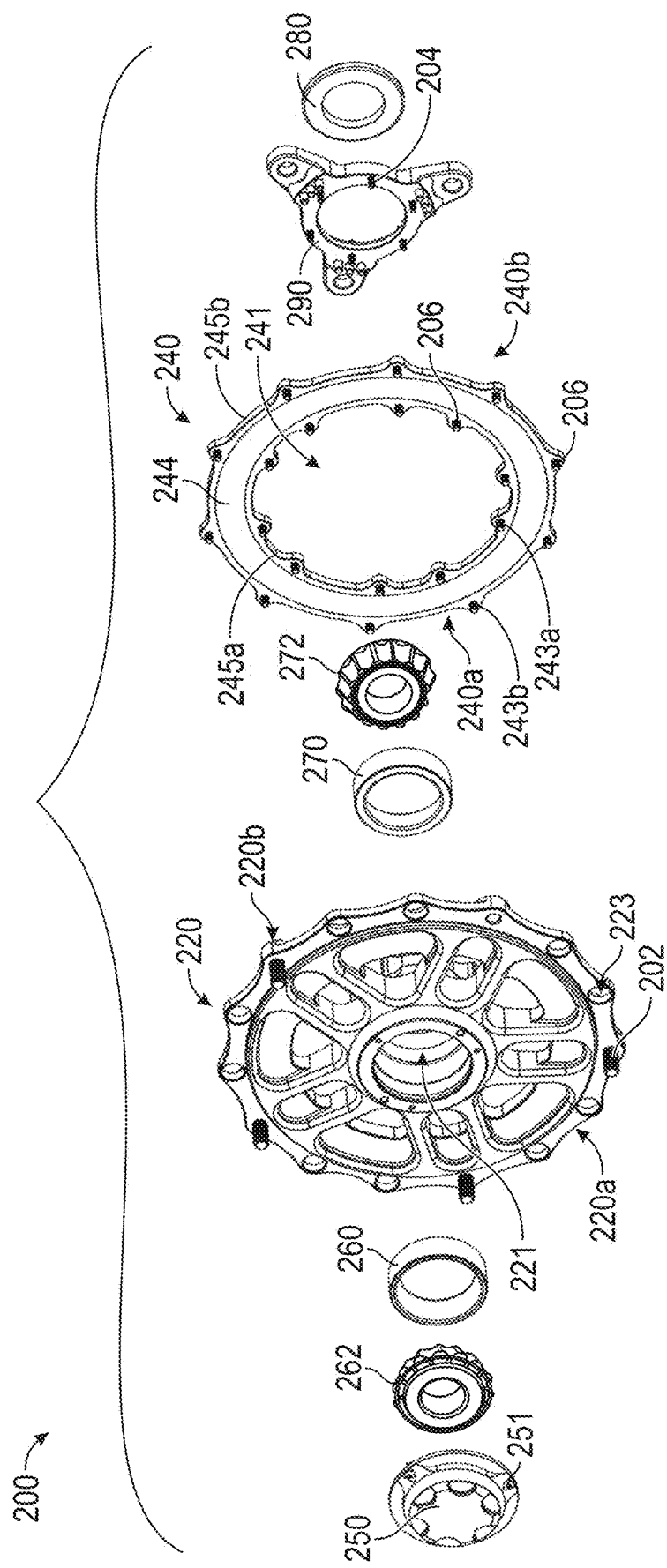

FRONT HUB WITH TIRE BALANCER FOR SPRINT CARS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates generally to systems and methods for adjusting and maintaining tire balance in oval track racing cars, such as sprint cars, micro sprint cars, and/or midget cars.

Description of the Related Art

Tire balance can affect the ability of a tire to grip the road. In racing, tire balance needs to be controlled in order to achieve best performance. Unbalanced wheels may result in vibrations, poor fuel economy, steering problems, uneven tire wear, suspension issues, and/or brake issues. Thus, in racing, balanced tires may improve stability, traction, and overall responsiveness, especially at high speeds.

Tires are typically balanced prior to the start of the race to achieve maximum performance. However, tire balance may change during a race due to weight transfer caused by acceleration, braking, and cornering. For example, acceleration, braking, and/or cornering may shift a car's weight distribution between the front and rear axles. Further, as fuel is consumed the center of gravity of a car may shift, further altering the balance throughout the race. Conventional balancing techniques and/or devices, such as wheel weights, may not be enough to maintain wheels balanced. Further, installation of conventional balancing systems and/or devices may be lengthy and/or may be impractical during a race. Thus, there is a need for better balancing techniques and devices for racing cars.

SUMMARY

There is provided in accordance with some aspects of the present disclosure, a balancer hub assembly for oval racing cars. The balancer hub assembly can include a hub including a front face, a rear face, a center bore, a groove on the rear face, and a center hub on the rear face; a cap including a front face, a rear face, and a groove on the front face, wherein the cap is removably couplable to the hub, and wherein the groove of the hub and the groove of the cap form a chamber when the hub and the cap are coupled to each other; a center cap removably couplable to the front face of the hub; a plurality of ball bearing (BB) pellets positioned inside the chamber; oil positioned inside the chamber; one or more O-rings positioned between the hub and the cap, wherein the one or more O-rings are configured to seal the plurality of ball bearing (BB) pellets and the oil inside the chamber; and a brake hub removably couplable to the center hub of the hub, wherein the brake hub is configured to receive and secure a brake assembly.

In some aspects, the balancer hub assembly can include a spindle removably couplable to the hub via a spindle nut extending through the center bore of the hub. When the balancer hub assembly is secured to a wheel, the spindle can be configured to allow rotation of a wheel. The spindle can be removably couplable to one or more steering arms, one or more tie rods, and/or a front axle of a racing car.

In some cases, the balancer hub assembly can include a first bearing race and a first bearing cone removably positioned in the center bore; and/or a second bearing race and a second bearing cone removably positioned in the center bore. In some aspects, the first bearing race and the first bearing cone can be spaced apart from the second bearing race and the second bearing cone respectively.

The plurality of ball bearing (BB) pellets can include a tungsten material. In some cases, a total weight of the plurality of ball bearing (BB) pellets can be between about 0.8 pounds and about 1.1 pound.

There is also provided in accordance with some aspects of the present disclosure, a balancer hub assembly for oval racing cars. The balancer hub assembly can include a hub including a groove; a cap including a groove and removably couplable to the hub, wherein the groove of the hub and the groove of the cap form a chamber when the hub and the cap are coupled to each other; a plurality of ball bearing (BB) pellets positioned inside the chamber; oil positioned inside the chamber; and one or more O-rings positioned between the hub and the cap, wherein the one or more O-rings are configured to seal the plurality of ball bearing (BB) pellets and the oil inside the chamber.

In some aspects, the hub further can include a front face, a rear face, a center bore, and a center hub on the rear face. The groove can be positioned on the rear face.

The cap can include a front face, and a rear face. The groove is positioned on the front face.

In some cases, the balancer hub assembly can include a center cap removably couplable to the hub. In some aspects, the balancer hub assembly can include a brake hub removably couplable to the hub. The brake hub can be configured to receive and secure a brake assembly. The balancer hub assembly can include a spindle removably couplable to the hub. When the balancer hub assembly is secured to a wheel, the spindle can be configured to allow rotation of a wheel. In some cases, the spindle can be removably couplable to one or more steering arms, one or more tie rods, and/or a front axle of a racing car.

In some aspects, the balancer hub assembly can include a first bearing race and a first bearing cone removably positioned in a center bore of the hub; and/or a second bearing race and a second bearing cone removably positioned in the center bore of the hub. The first bearing race and the first bearing cone can be spaced apart from the second bearing race and the second bearing cone respectively. In some cases, the plurality of ball bearing (BB) pellets can include a tungsten material.

There is also provided in accordance with some aspects of the present disclosure, a method of self-balancing a tire for oval racing cars. The method can include mounting a balancer hub assembly to a front wheel assembly, wherein rotation of the front wheel assembly causes rotation of the balancer hub assembly, and wherein the balancer hub assembly includes, a hub including a groove; a cap including a groove and removably couplable to the hub, wherein the groove of the hub and the groove of the cap form a chamber when the hub and the cap are coupled to each other; a plurality of ball bearing (BB) pellets positioned inside the chamber; and oil positioned inside the chamber; wherein rotation of the balancer hub assembly causes at least some of the plurality of ball bearing (BB) pellets to move to opposite sides of one or more heavy spots of the front wheel assembly so that the plurality of ball bearing (BB) pellets can distribute a weight of the front wheel assembly evenly.

In some aspects, the method can include mounting a spindle to the balancer hub assembly. The spindle can be removably couplable to one or more steering arms, one or more tie rods, and/or a front axle of an oval racing car.

The method can include positioning one or more O-rings between the hub and the cap to seal the plurality of ball bearing (BB) pellets and the oil inside the chamber.

In some cases, the method can include positioning between about 0.8 pounds and about 1.1 pound of the plurality of ball bearing (BB) pellets inside the chamber.

There is also provided in accordance with some aspects of the present disclosure, a balancer hub assembly for oval racing cars. The balancer hub assembly can include a body comprising a front face, a rear face, a center bore, and a groove on the rear face; a cap comprising a front face, a rear face, and a groove on the front face, wherein the cap is removably couplable to the body, and wherein the groove of the body and the groove of the cap form a chamber when the body and the cap are coupled to each other; a plurality of ball bearing (BB) pellets positioned inside the chamber; oil positioned inside the chamber; one or more O-rings positioned between the body and the cap, wherein the one or more O-rings are configured to seal the plurality of ball bearing (BB) pellets and the oil inside the chamber; and/or a wheel spacer removably couplable to the front face of the body, wherein the wheel spacer comprises a center bore having a plurality of teeth. The plurality of teeth can be configured to mesh with a plurality of corresponding splines of an axle to secure the balancer hub assembly to an oval racing car.

In some aspects, the balancer hub assembly can be secured to a rear axle of the oval racing car. The balancer hub assembly can be secured to a front axle of the oval racing car. In some cases, the wheel spacer can be positioned between the body and a wheel and/or a wheel hub. In some aspects, the spacer can be positioned between the cap and a suspension of the oval racing car. The plurality of ball bearing (BB) pellets can include a tungsten material. In some aspects, total weight of the plurality of ball bearing (BB) pellets is between about 0.8 pounds and about 1.1 pound. The wheel spacer is removably couplable to the front face of the body via one or more dowel pins.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

FIGS. 2C and 2D illustrate exploded views of the balancer shown in FIGS. 2A and 2B.

DETAILED DESCRIPTION

Figure 1:
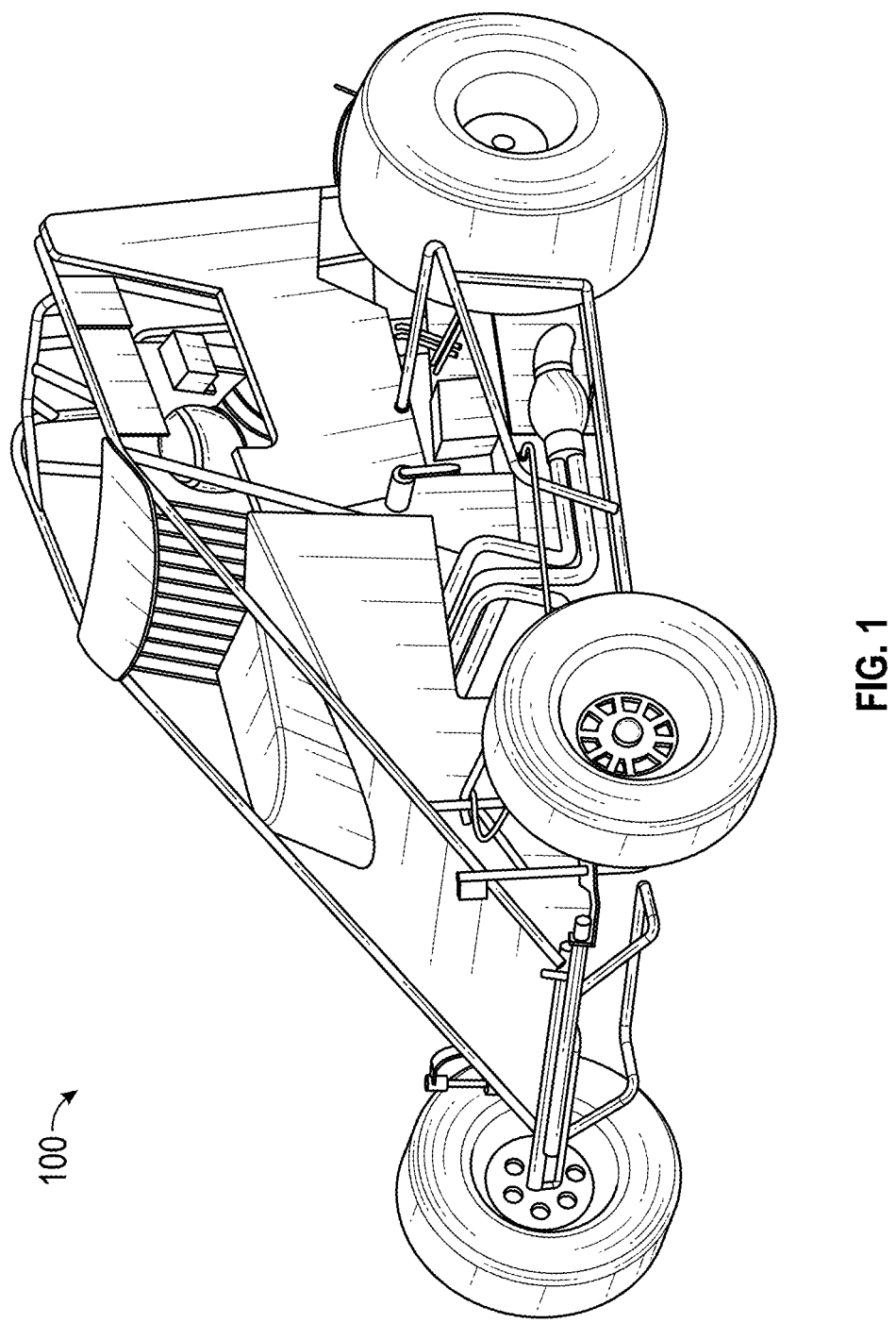
FIG. 1 illustrates an example of a sprint car.

FIG. 1 shows a racing car for oval track racing. The racing car 100 can be a sprint car. A sprint car is a type of open-wheel race car designed for short oval or circular dirt or paved tracks. Sprint cars can weigh more than about 1,000 pounds, and/or can be powered by naturally aspirated, methanol-injected overhead valve V8 engines, with a displacement of about 410 cubic inches (6.7 L). The engine of a sprint car can produce more than about 800 horsepower and/or produce engine speeds of about 8,000 RPMs or more. Further, sprint cars can achieve speeds in excess of 160 miles per hour. Sprint cars may include wingless sprint cars and/or winged sprint cars. FIG. 1 shows an example of a wingless sprint car.

Although reference is made herein to the racing car 100 being a sprint car for oval car racing, other types of racing cars for oval car racing can include a midget car and/or a micro sprint car. Midget cars are typically smaller versions of a full size sprint car. Unlike sprint cars, midget cars can weigh about 900 pounds, and/or can be powered by four-cylinder engines which can produce between about 300 and about 400 horsepower.

As further described herein, the racing car 100 can include one or more balancer hub assemblies for adjusting and/or maintaining tire balance prior, during, and after a race without attaching weights to or otherwise modifying the tires and/or wheels. The balancer hub assemblies described herein are configured to be easily and quickly installed on a front portion of the racing car 100 (e.g., on a spindle; solid axle; front axle, etc.) and/or on a rear portion of the racing car 100 (e.g., on a live axle; rear axle, etc.). In some cases, each wheel of the racing car 100 can include a corresponding balancer hub assembly. In racing, the balancing hub assembly can maintain tire balance which can beneficially improve performance, reduce fuel consumption, extend tire life, and/or prevent suspension failure.

Any of the balancer hub assemblies described herein can be installed on different types of racing cars (sprint cars, midget cars, and/or micro sprint cars). Further, the balancer hub assemblies described herein can be reused. For example, a balancer hub assembly can be uninstalled from a racing car and installed on a different racing car as needed. This can beneficially allow the balance hub assemblies to be used more than once and/or to be used in different types of racing cars without the need to install weights and/or modify the tires and/or wheels.

FIGS. 2A-2D show an example of a balancer hub assembly 200. The balancer hub assembly 200 can include a hub 220, a cap 240, a center cap 250, a first bearing race 260, a first bearing cone 262, a second bearing race 270, a second bearing cone 272, a seal 280 and/or a brake hub 290 (also referred herein to as a brake mount).

Figure 3A:
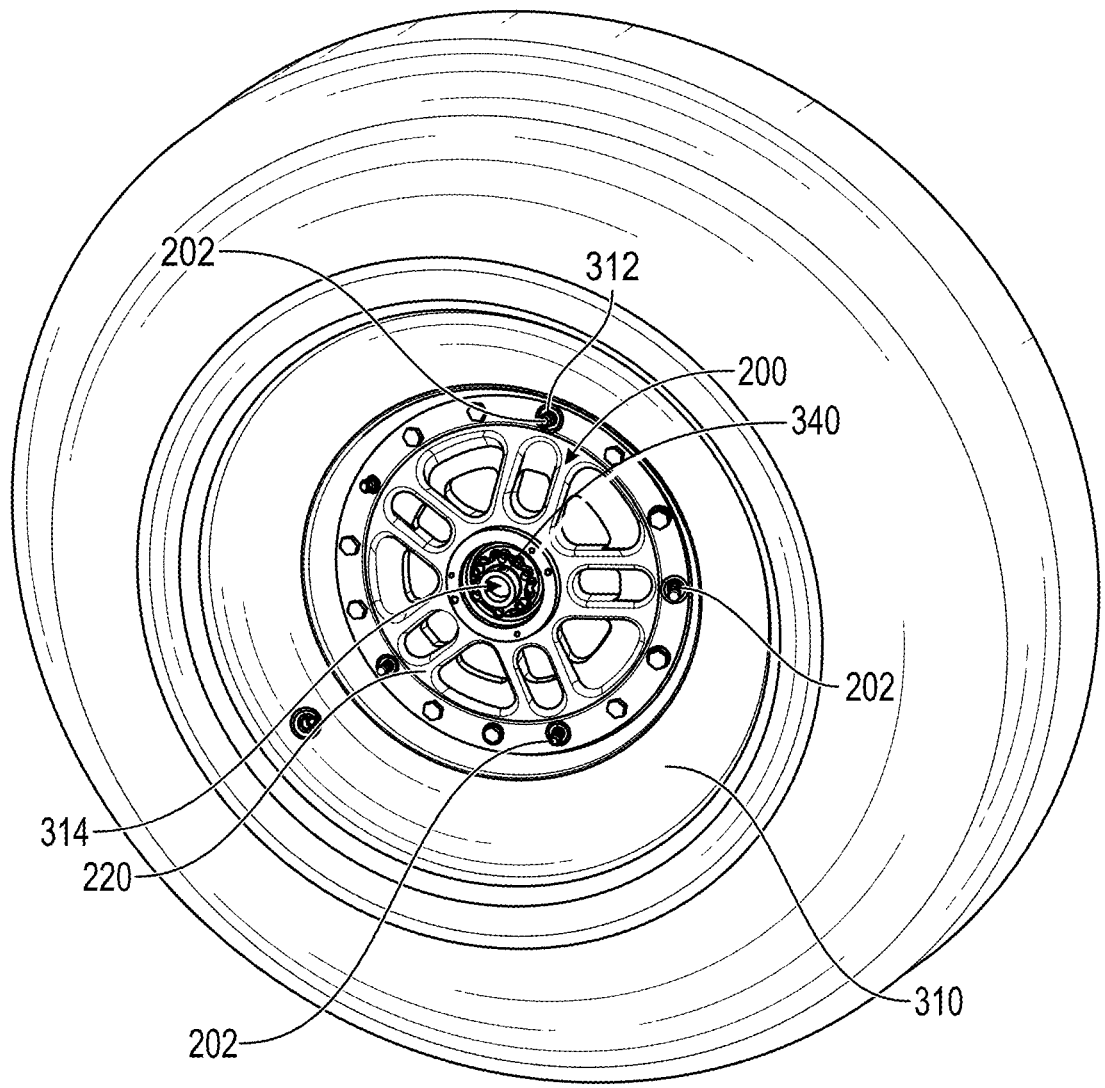
FIGS. 3A-3C illustrate an example of a balancer mounted to a wheel and tire assembly.
Figure 3B:
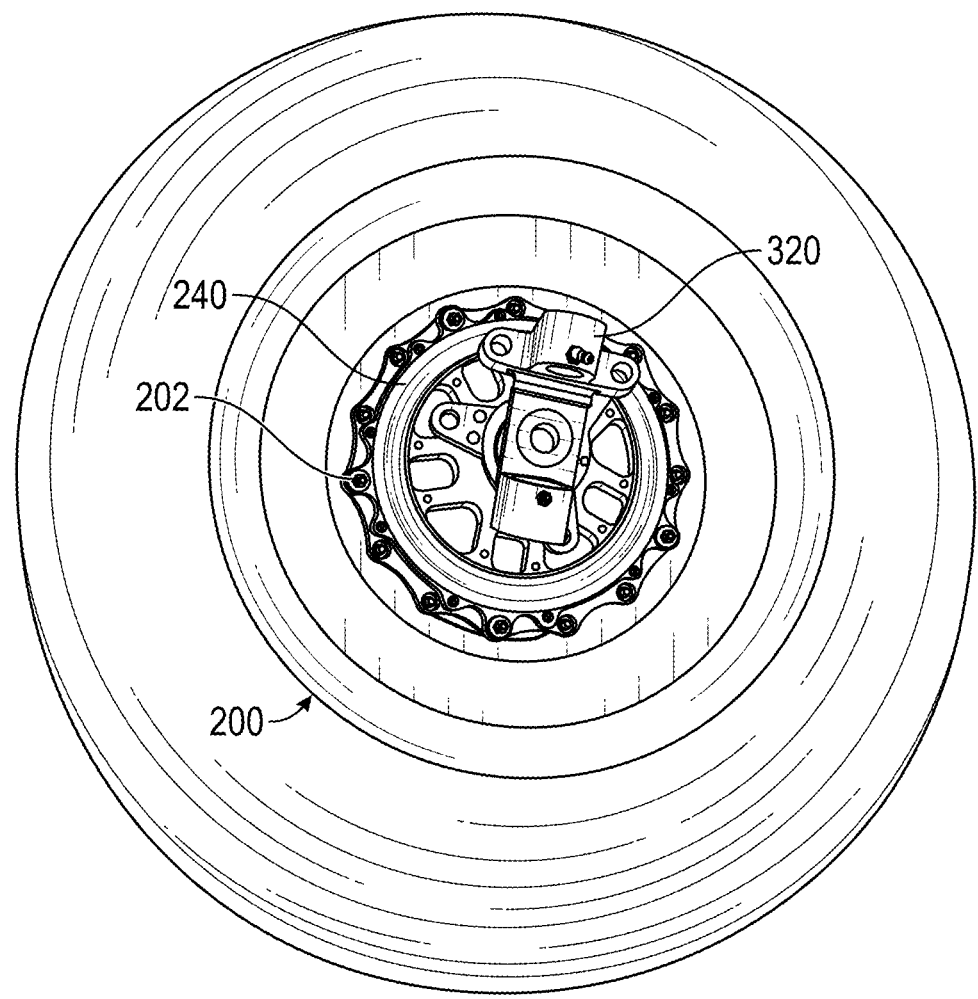

The hub 220 can include a front face 220a and a rear face 220b. The hub 220 can also include a center bore 221 and/or a plurality of spokes 222. In some cases, the hub 220 does not include a plurality of spokes 222. In such cases, the hub 220 can include a continuous surface extending from the center bore 221 to an outer perimeter of the hub 220. The center cap 250 can be removably secured to the hub 220 via one or more screws 251. In some cases, the hub 220 can include a plurality of holes 223. The plurality of holes 223 can be positioned adjacent to an outer perimeter of the hub 220. One or more screws 202 can extend through the plurality of holes 223. Although the figures show the balancer hub assembly 200 with four screws 202, the balancer hub assembly 200 can include a screw 202 for each hole 223. As further described herein, the one or more screws 202 can facilitate attachment of the balancer hub assembly 200 to a wheel, as shown in FIGS. 3A and 3B.

Figure 2A:
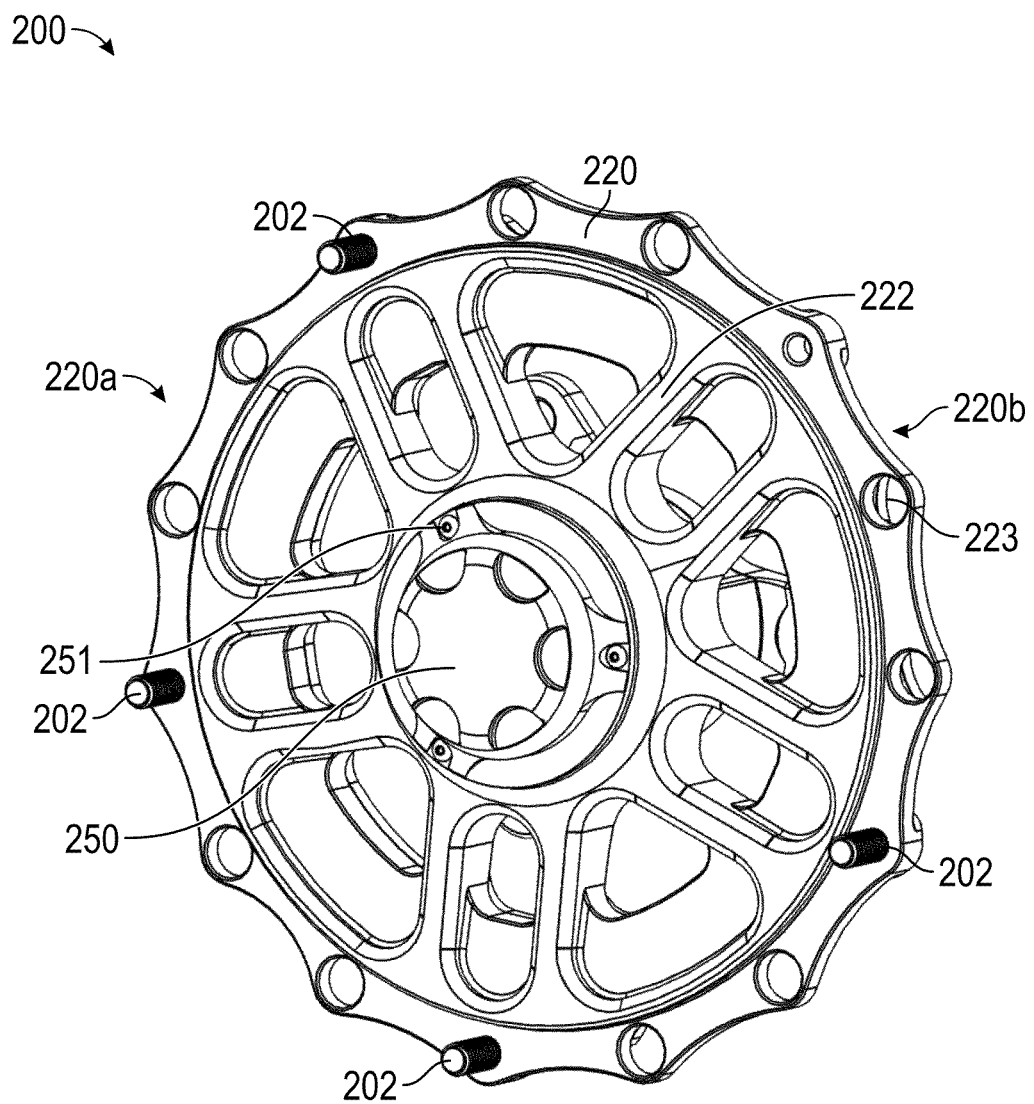
FIG. 2A illustrates a front view of an example of a balancer.
Figure 2B:
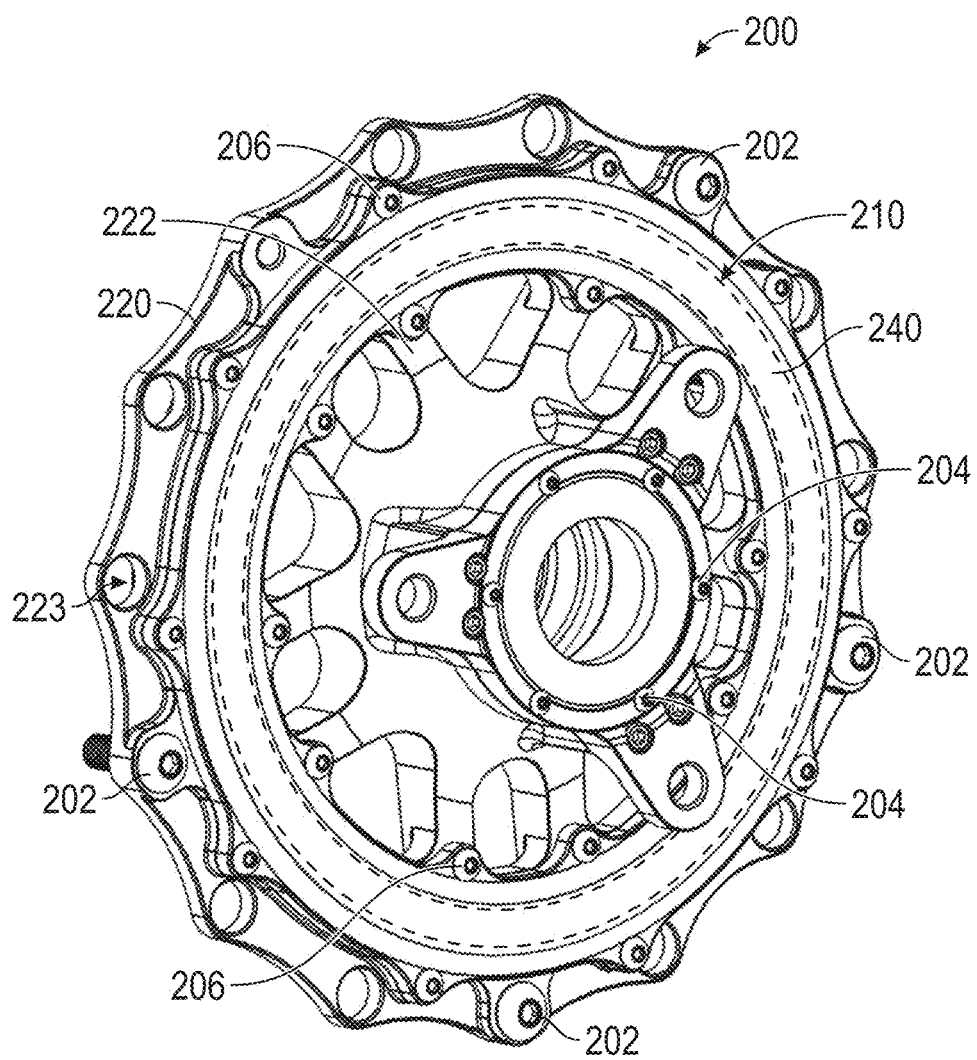
FIG. 2B illustrates a rear view of the balancer shown in FIG. 2A.
Figure 2D:
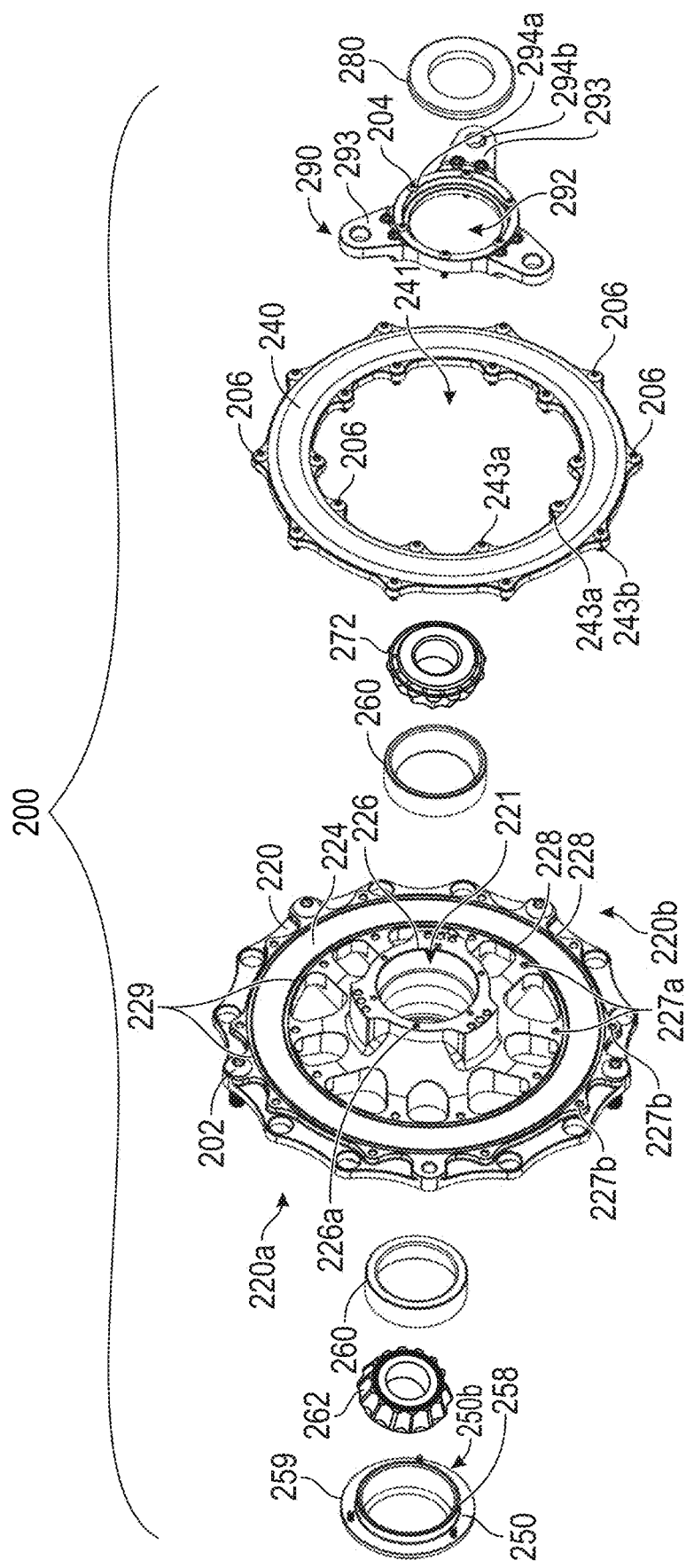

As shown in FIG. 2D, the rear face 220b of the hub 220 can include a groove 224 (also referred herein to as a recess). In some cases, the groove 224 can have a circular shape. However, the groove 224 can include other shapes (e.g., square shape, etc.). The rear face 220b can also include a center hub 226. The center hub 226 can include one or more holes 226a. The one or more holes 226a can include screw holes. In some cases, the one or more holes 226a can receive one or more screws 204 to facilitate attachment of the brake hub 290 to the hub 220. The rear face 220b can include a first plurality of holes 227a and/or a second plurality of holes 227b. The first plurality of holes 227a can be positioned along the plurality of spokes 222. The second plurality of holes 227b can be positioned radially outward from the first plurality of holes 227a. The first plurality of holes 227a and/or the second plurality of holes 227b can include screw holes. In some cases, the first plurality of holes 227a and/or the second plurality of holes 227b can receive one or more screws 206 to facilitate attachment of the cap 240 to the hub 220.

The cap 240 can include a front face 240a and a rear face 240b. The cap 240 can also include a center hole 241. In some cases, the cap 240 can include a first plurality of holes 243a and/or a second plurality of holes 243b. The first plurality of holes 243a can be positioned adjacent to an inner perimeter 245a of the cap 240. The second plurality of holes 243b can be positioned adjacent to an outer perimeter 245b of the cap 240. In some cases, the first plurality of holes 243a and/or the second plurality of holes 243b can receive one or more screws 206 to facilitate attachment of the cap 240 to the hub 220. At least when the cap 240 is attached to the hub 220, the first plurality of holes 243a can be aligned with a corresponding hole from the first plurality of holes 227a of the hub 220 and/or the second plurality of holes 243b can be aligned with a corresponding hole from the second plurality of holes 227b of the hub 220.

As shown in FIG. 2C, the front face 240a of the cap 240 can include a groove 244 (also referred herein to as a recess). In some cases, the groove 244 can have a circular shape. However, the groove 244 can include other shapes. When the hub 220 and the cap 240 are secured to each other, the groove 224 and the groove 244 can form a chamber 210 between the hub 220 and the cap 240. In some cases, the chamber can include a donut shape. As further described in relation to FIGS. 6A-6D, the chamber formed by the grooves 224, 244 can be at least partially filled with a plurality of ball bearing (BB) pellets and/or oil. In some cases, the chamber can be sealed by one or more seals and/or gaskets. The one or more seals and/or gaskets can be positioned between the hub 220 and the cap 240. For example, one or more O-rings 228 can be positioned along one or more grooves 229. The one or more or grooves 229 can be positioned along the rear face 220b of the hub 220. For example, the one or more grooves 229 can be positioned adjacent to an outer diameter and/or an inner diameter of the groove 224.

The first bearing race 260 and/or the second bearing race 270 can be positioned in the center bore 221 of the hub 220. In some cases, the first and second bearing races 260, 270 can include a tapered shape. The tapered shape can allow the first and second bearing races to receive (e.g., nest) and secure the first and second bearing cones 262, 272 respectively. In some cases, the first bearing race 260 and/or the first bearing cone 262 can be positioned inside the center bore 221 through the front face 220a of the hub 220. The second bearing race 270 and/or the second bearing cone 272 can be positioned inside the center bore 221 through the rear face 220b of the hub 220.

The first and second bearing cones 262, 272 can include inner and outer rings that can provide a surface for a plurality of rolling elements positioned between the inner and outer rings to move relative to the first and second bearing races 260, 270 respectively. The first and second bearing races 260, 270 can allow the balancer hub assembly 200 to rotate relative to a spindle thus allowing rotation of the wheel and/or tire that the balancer hub assembly is secured to. In some cases, the seal 280 can be positioned along a center hole 292 of the brake hub 290. The seal 280 and/or the center cap 250 can seal the bearing races 260, 270 and/or the bearing cones 262, 272 inside the center bore 221 beneficially protecting the bearing races 260, 270 and/or the bearing cones 262, 272 from dirt, dust, moisture and other foreign objects. In some cases, one or more seals and/or gaskets can be positioned between the center cap 250 and the front face 220a of the hub 220. For example, one or more O-rings 258 can be positioned along one or more grooves 259. The one or more or grooves 259 can be positioned along a rear face 250b of the center cap 250. The seal 280 and/or the center cap 250 can seal a lubricant inside the center bore 221. The lubricant can extend the useful life of the bearing races 260, 270 and/or the bearing cones 262, 272, and/or improve performance thereof, by reducing friction between the bearing races 260, 270 and the bearing cones 262, 272. The first and second bearing cones 262/272 can be spaced from each other when sealed inside the center bore 221.

When the balancer hub assembly 200 is secured to a wheel, spindle, axle, and/or a corresponding steering mechanism (e.g., lower control arm, upper control arm, sway bar, rack and pinion unit, steering column, etc.) the balancer hub assembly 200 can spin with the wheel but allow steering to ensure that that the wheels are pointing in the desired direction to move the car as required.

The brake hub 290 can include one or more arms 293 extending radially outward. In some cases, the brake hub 290 can include three arms 293. The brake hub 290 can include less than or more than three arms 293. The brake hub 290 can include a first plurality of holes 294a and/or a second plurality of holes 294b. The first plurality of holes 294a can be positioned adjacent to the center hole 292. The second plurality of holes 294b can be positioned on the one or more arms 293. In some cases, the first plurality of holes 294a can receive one or more screws 204 to facilitate attachment of the brake hub 290 to the hub 220. At least when the brake hub 290 is attached to the hub 220, the first plurality of holes 294a can be aligned with a corresponding hole from the one or more holes 226a of the center hub 226. In some cases, at least one hole of the second plurality of holes 294b can receive a screw to facilitate attachment of the brake hub 290 to a brake assembly (e.g., brake rotor, brake hub, brake pad, caliper, etc.), as shown in FIG. 3D.

FIGS. 3A-3D show a balancer hub assembly 200 secured to a wheel. In some cases, each front wheel of car and/or a racing car can be installed with a balancer hub assembly 200. Although reference is made herein to the balancer hub assembly 200 being installed on front wheels, the balancer hub assembly 200 can be implemented on rear wheels. FIG. 3A shows the outside of a wheel 310. As shown in FIG. 3A, the one or more screws 202 can be aligned with one or more holes 312 of the wheel 310 to facilitate attachment of the balancer hub assembly 200 to the wheel 310. One or more wheel nuts (not shown) can be secured to the exposed ends of the one or more screws 202 to secure the wheel 310 to the balancer hub assembly 200. When the hub assembly 200 is secured to the wheel 310, a spindle nut 340 can extend through a center bore 314 of the wheel 310 and/or the center bore 221 of the hub 220. The spindle nut 340 can be secured using a nut (not shown). When the canter cap 250 is secured to the hub assembly 200, the spindle nut can be sealed inside the center bore 221. The balancer hub assembly 200 can be installed on any type of wheel. This can beneficially allow the balancer hub assembly 200 to be used and/or reused on different racing cars. Further, the balancer hub assembly 200 can be replaced conveniently and is easily serviceable.

Figure 3C:
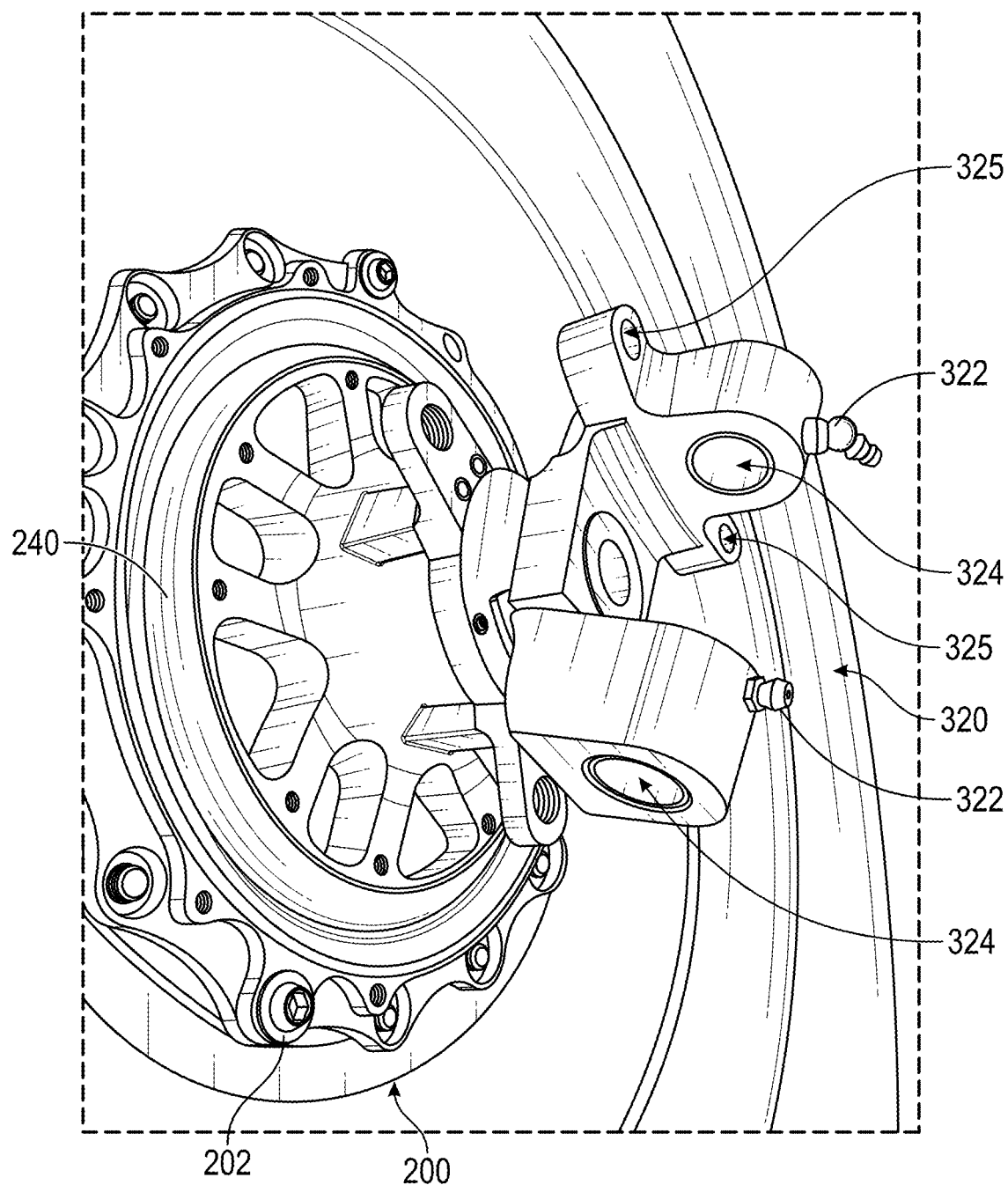
Figure 3D:
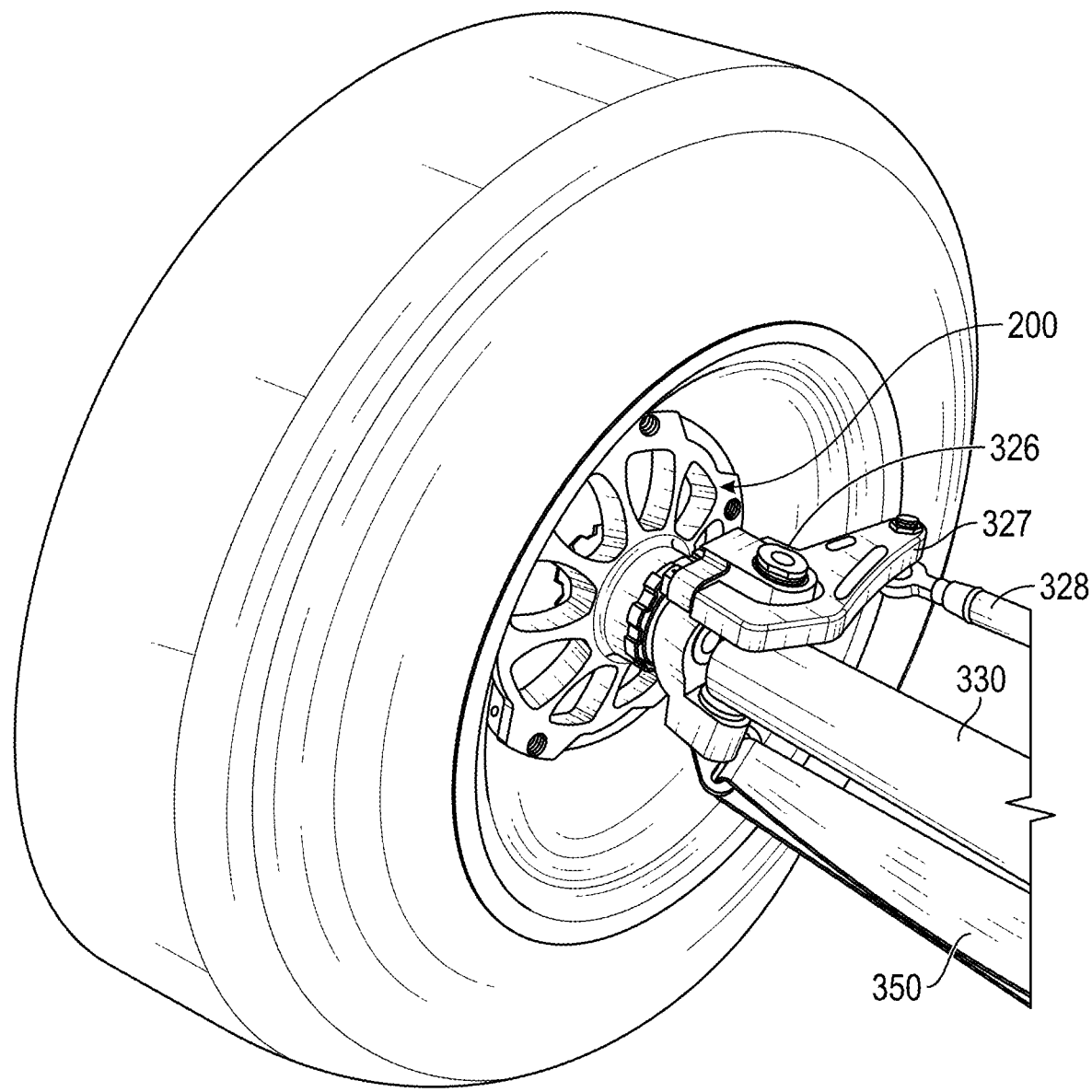
FIG. 3D illustrates an example of a balancer mounted to a spindle.

As shown in FIGS. 3B and 3C, a spindle 320 can be secured to the balancer hub assembly 200. In some cases, the spindle 320 can be secured to the balancer hub assembly 200 by inserting a coupling structure (e.g., the spindle nut 340) of the spindle 320 into the center hole 292 of the brake hub 290 and securing a nut on the exposed end of the coupling structure. As shown in FIG. 3C, the spindle 320 can include one or more grease fittings 322.

The spindle 320 can include one or more holes 324. The one or more holes 324 can receive and secure a king pin 326, as shown in FIG. 3D. In some cases, the king pin 326 can facilitate attachment of the spindle 320 to a front axle 330. The front axle 330 can include a solid axle. The spindle can also include one or more holes 325. The holes 325 can facilitate attachment of one or more steering arms 327 to the spindle 320. The steering arms 327 can be secured to one or more tie rods 328. The grease fittings 322 can be used to feed lubricants, usually lubricating grease, to the king pin 326. The lubricant can reduce friction, minimize heat, and/or prevent damage to the king pin 326. In some cases, a safety strap 350 can be secured to the spindle 320. The safety strap 350 can keep the wheel 310 and/or the balancer hub assembly 200 attached to the racing car in the event of a collision. The safety strap 350 can beneficially prevent the wheel 310 and/or the balancer hub assembly 200 from flying off and injuring drivers, marshals, and/or spectators.

FIGS. 4A-4D show an example of a balancer hub assembly 400. The balancer hub assembly 400 can include an body 420, a cap 440, and/or a wheel spacer 450.

The body 420 can include a front face 420a and a rear face 420b. The body 420 can also include a center bore 421 and/or a plurality of spokes 422. In some cases, the body 420 does not include a plurality of spokes 422. In such cases, the body 420 can include a continuous surface extending from the center bore 421 to an outer perimeter of the body 420. In some cases, the body 420 can include a first plurality of holes 423a and/or a second plurality of holes 423b. The first plurality of holes 423a can be positioned adjacent to the center bore 421. The second plurality of holes 423b can be positioned adjacent to an outer perimeter of the body 420. One or more screws 402 can extend through the first plurality of holes 423a and/or the second plurality of holes 423b. As further described herein, the one or more screws 402 can facilitate attachment of the body 420 to the cap 440. As shown in FIG. 4D, the rear face 420b of the body 420 can include a groove 424 (also referred hereinto as a recess). In some cases, the groove 424 can have a circular shape. However, the groove 424 can include other shapes.

The cap 440 can include a front face 440a and a rear face 440b. The cap 440 can also include a center hole 441. In some cases, the cap 440 can include a first plurality of holes 443a and/or a second plurality of holes 443b. The first plurality of holes 443a can be positioned adjacent to an inner perimeter 445a of the cap 440. The second plurality of holes 443b can be positioned adjacent to an outer perimeter 445b of the cap 440. In some cases, the first plurality of holes 443a and/or the second plurality of holes 443b can receive the one or more screws 402 to facilitate attachment of the cap 440 to the body 420. At least when the cap 440 is attached to the body 420, the first plurality of holes 443a can be aligned with a corresponding hole from the first plurality of holes 423a of the body 420 and/or the second plurality of holes 443b can be aligned with a corresponding hole from the second plurality of holes 423b of the body 420.

Figure 4A:
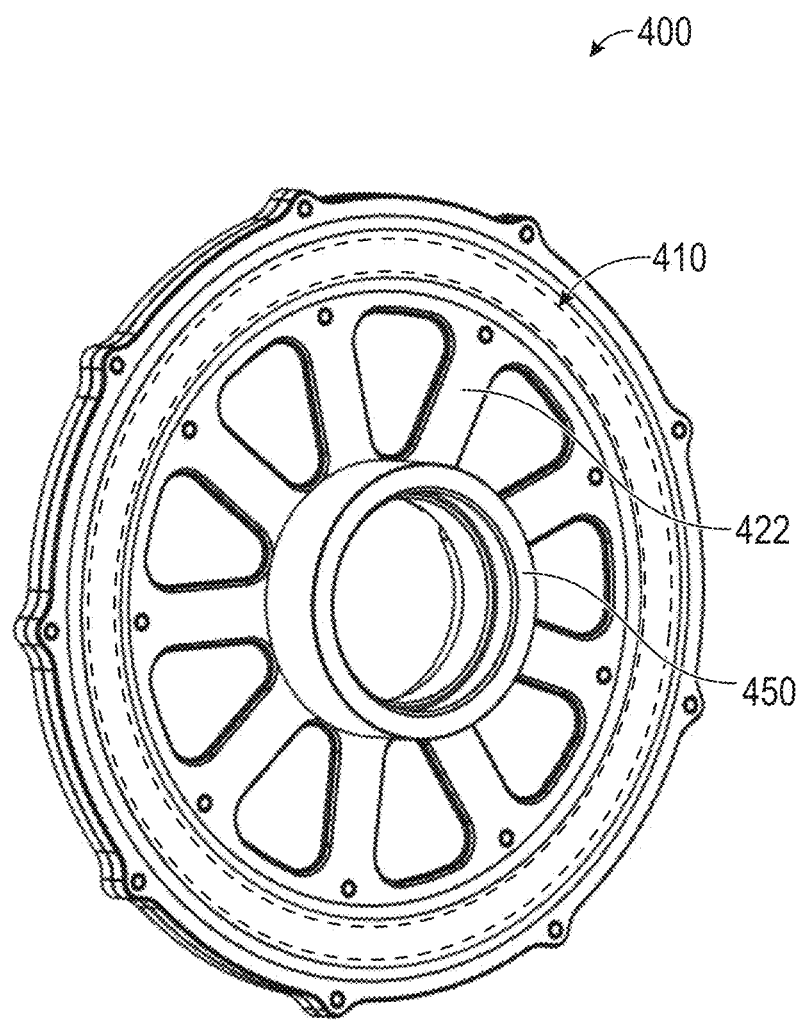
FIG. 4A illustrates a front view of an example of a balancer.
Figure 4B:
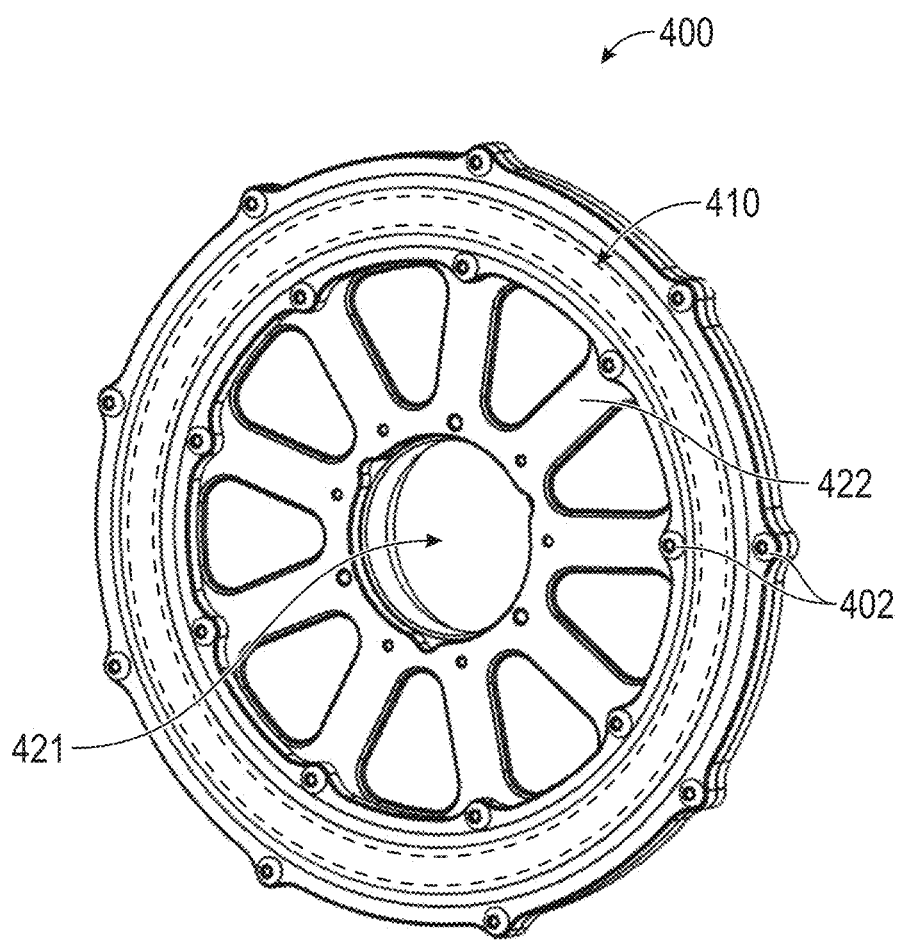
FIG. 4B illustrates a rear view of the balancer shown in FIG. 4A.
Figure 4C:
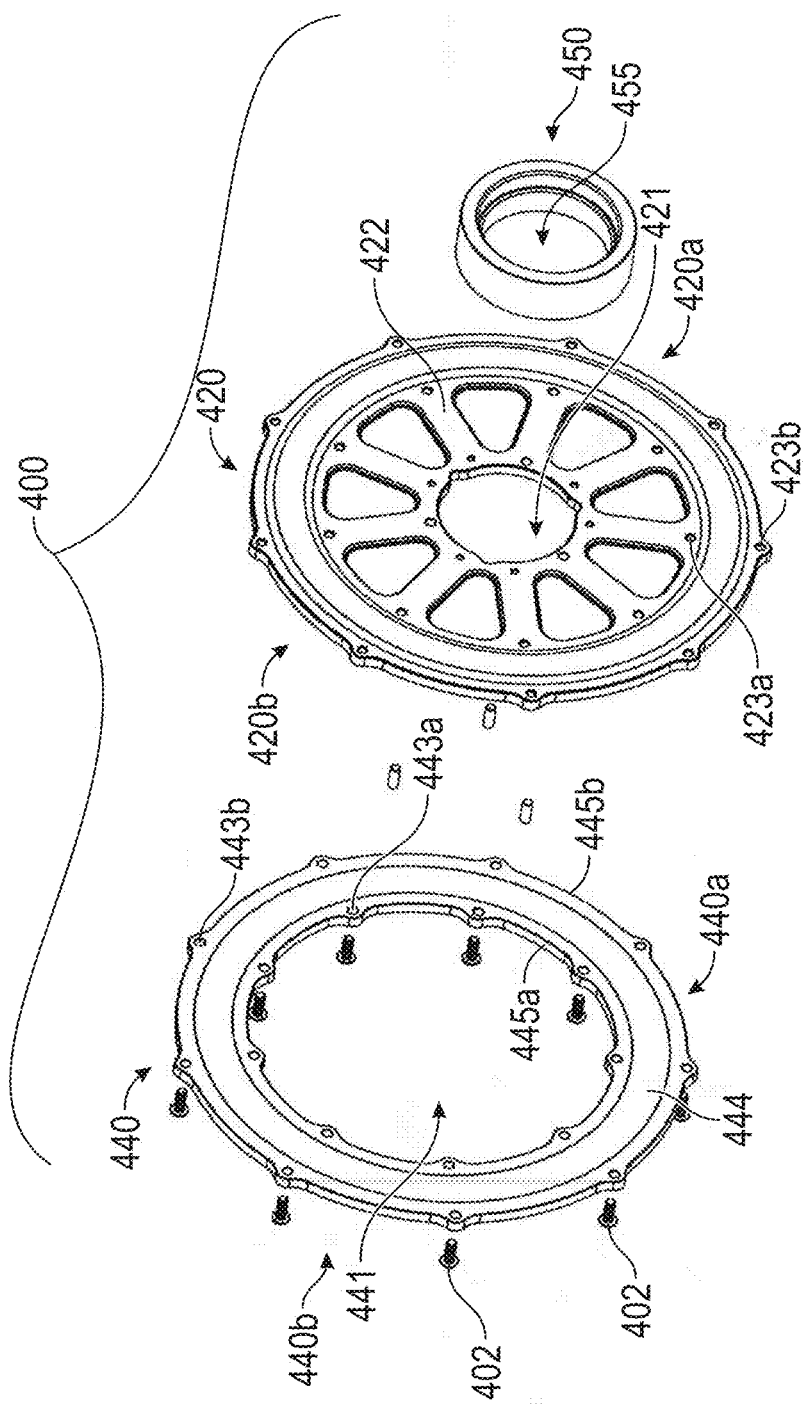
FIGS. 4C and 4D illustrate exploded views of the balancer shown in FIGS. 4A and 4B.
Figure 4D:
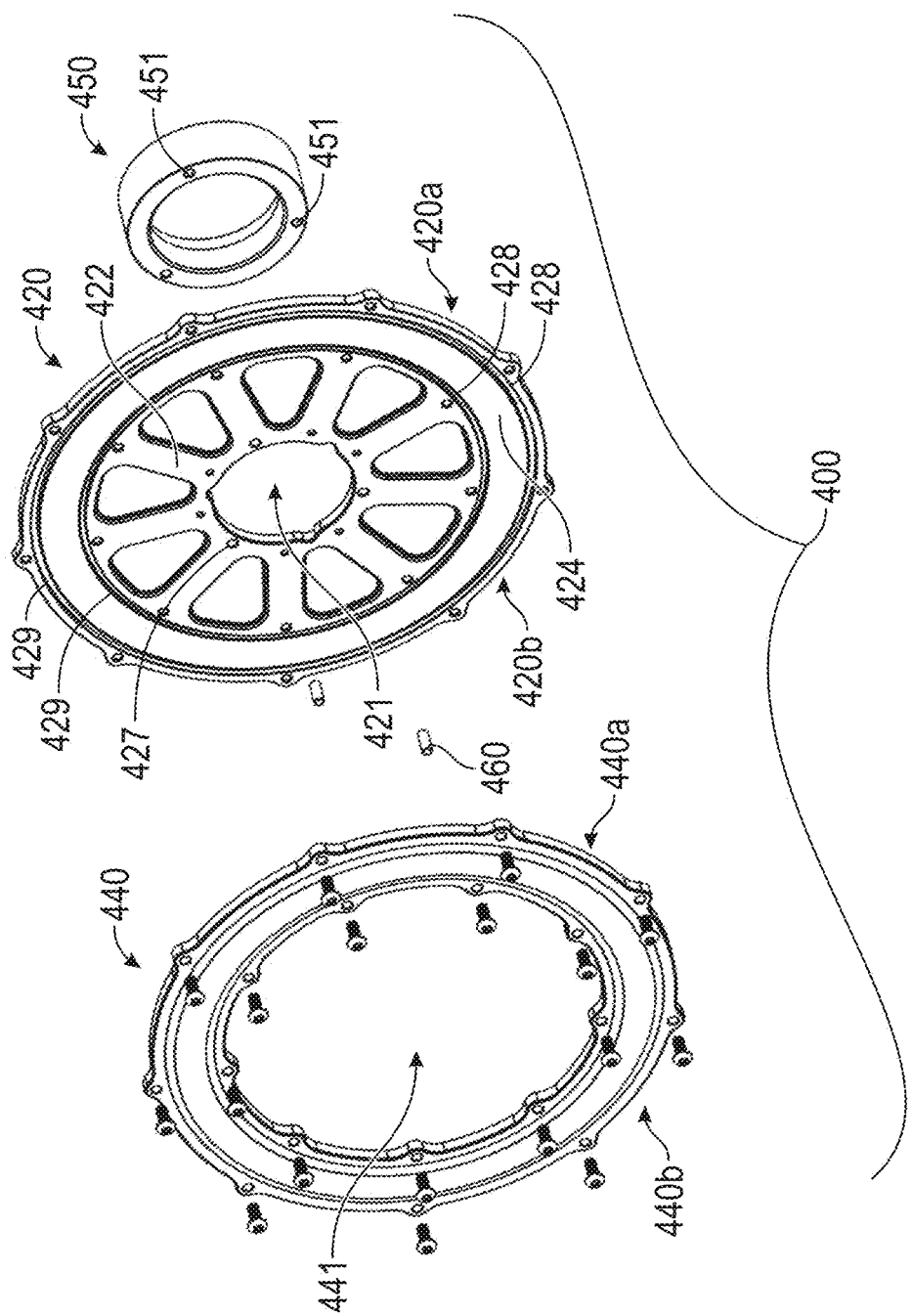

As shown in FIG. 4C, the front face 440a of the cap 440 can include a groove 444 (also referred herein to as a recess). In some cases, the groove 444 can have a circular shape. However, the groove 444 can include other shapes. When the body 420 and the cap 440 are secured to each other, the groove 424 and the groove 444 can form a chamber 410 between the body 420 and the cap 440. In some cases, the chamber can include a donut shape. As further described in relation to FIGS. 6A-6D, the chamber formed by the grooves 424, 444 can be at least partially filled with a plurality of ball bearing (BB) pellets and/or oil. In some cases, the chamber can be sealed by one or more seals and/or gaskets. The one or more seals and/or gaskets can be positioned between the body 420 and the cap 440. For example, one or more O-rings 428 can be positioned along one or more grooves 429. The one or more or grooves 429 can be positioned along the rear face 420b of the body 420. For example, the one or more grooves 429 can be positioned adjacent to an outer diameter and/or an inner diameter of the groove 424.

Figure 5A:
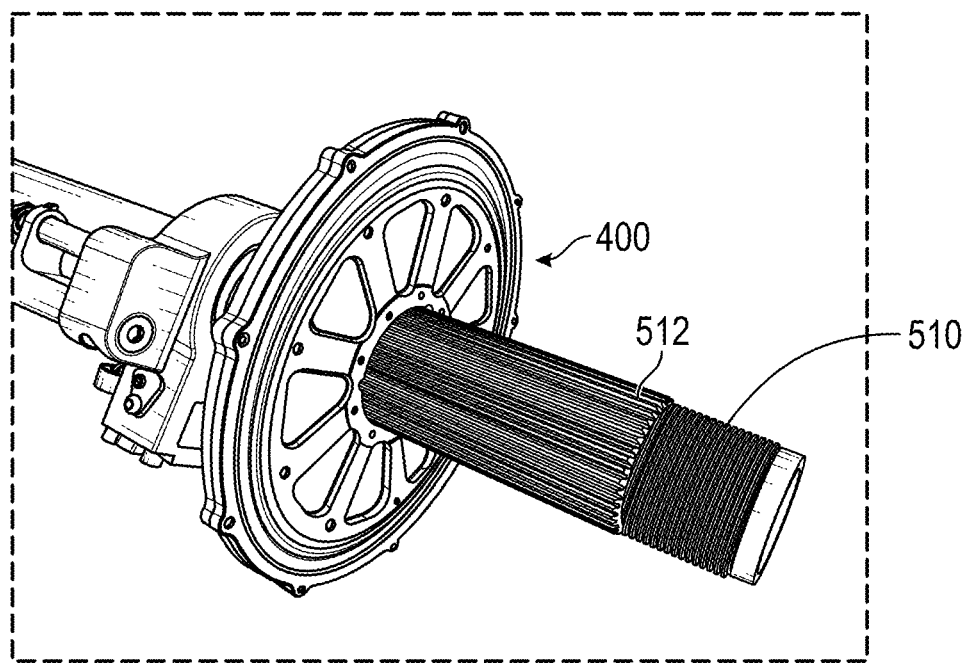
FIG. 5A illustrates an example of a balancer mounted to an axle.

FIGS. 5A-5D show a balancer hub assembly 400 mounted to an axle of a car. In some cases, the rear axle of a car and/or racing car can include a balancer hub assembly 400 for each rear wheel. Although reference is made herein to the balancer hub assembly 400 being mounted on a rear axle, the balancer hub assembly 400 can be implemented on front wheels. As shown in FIG. 5A, a balancer hub assembly 400 can be mounted to an axle 510 via the center bore 421. The axle 510 can include a live axle. The balancer hub assembly 400 can be installed on any type of axle. This can beneficially allow the balancer hub assembly 400 to be installed on different racing cars. Further, the balancer hub assembly 400 can be replaced quickly and is easily serviceable.

Figure 5B:
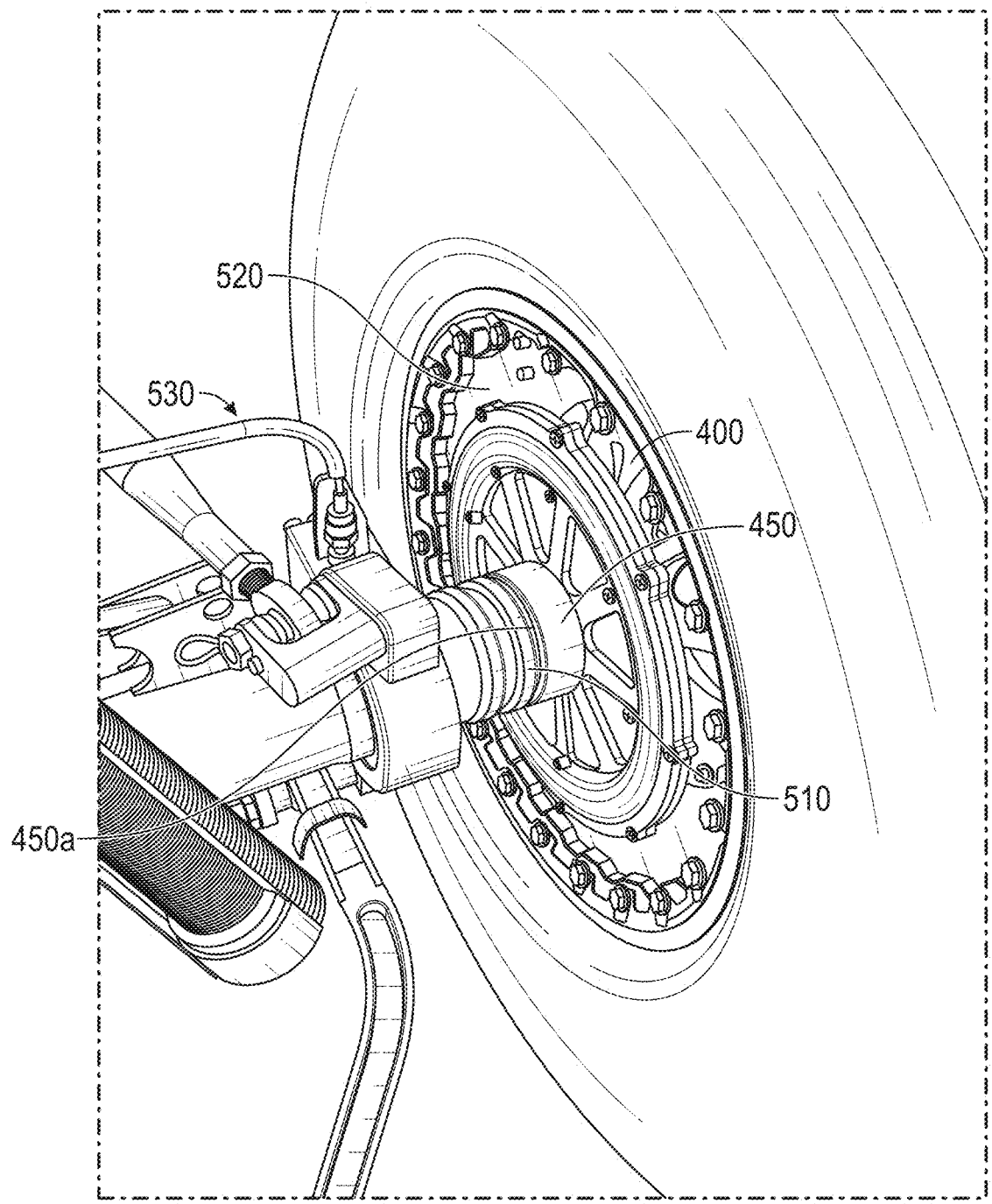
FIG. 5B illustrates the balancer shown in FIG. 5A with a wheel and a tire secured to the axle.

The axle 510 can include one or more splines 512. The splines 512 may prevent rotation of the balancer hub assembly 400 relative to the axle 510. For instance, a center bore 455 of the wheel spacer 450 can include one or more teeth 450a that can mesh with the splines 512 when the balancer hub assembly 400 is mounted to the axle 510. Thus, in some cases, the balancer hub assembly 400 may spin only when the axle 510 spins. In some cases, the wheel spacer 450 can be positioned between the body 420 and a wheel 520 and/or a wheel hub mounted to the axle 510. The spacer 450 can also be positioned between the cap 440 and a suspension 530 of the racing car, as shown in FIG. 5B. The wheel spacer 450 can be secured to the body 420 via a plurality of dowel pins 460. In some cases, the plurality of dowel pins 460 can be made of steel. The plurality of dowel pins 460 can be positioned on a plurality of holes 451 of the wheel spacer 450. The wheel spacer 450 can be secured to the body 420 by press-fitting the dowel pins 460 positioned in the plurality of holes 451 into a plurality of holes 427 of the body 420. The wheel spacer 450 can have different thicknesses to allow wheels and/or tires of various sizes to be used. For instance, the wheel spacer 450 can have different thicknesses to allow wheels to be positioned closer to and/or farther away from a center point of the axle 510.

Figure 6A:
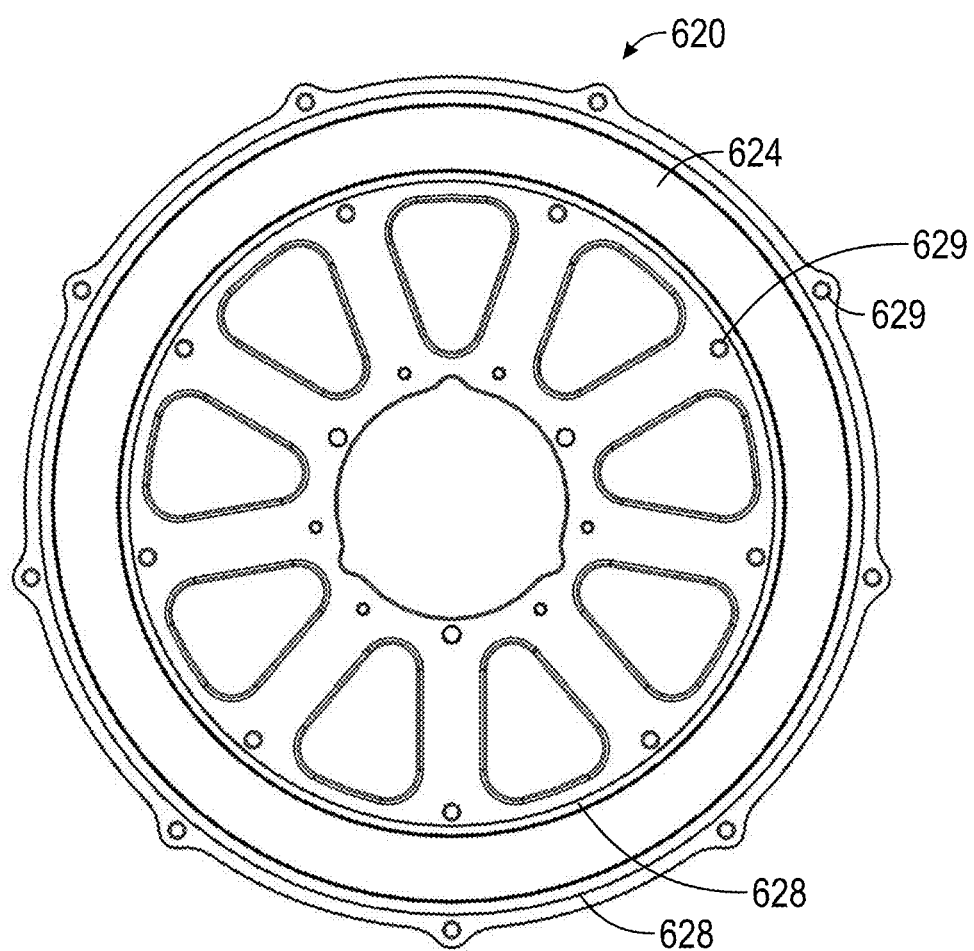
FIG. 6A illustrates an example of a body of a balancer with a groove.

Any of the balancer hub assemblies described herein can include ball bearing (BB) pellets and/or oil positioned inside the chamber formed by the grooves in the body and/or the cap. FIG. 6A shows an example of an body 620. The body 620 can be similar or identical to the body 420, which is described in relation to FIGS. 4A-4B. A plurality of ball bearing (BB) pellets 680 can be positioned in the groove 624, as shown in FIG. 6B. In some cases, the ball bearing (BB) pellets 680 can be made out of tungsten. However, the ball bearing (BB) pellets 680 can include other materials such as gold, steel, lead, copper, zinc, or a combination thereof. In some cases, from about 0.1 pounds to about 5 pounds, from about 0.5 pounds to about 4 pounds, from about 0.7 pounds to about 3 pounds, from about 0.8 pounds to about 2 pounds, and/or from about 0.9 pounds to about 1.1 pounds, of ball bearing (BB) pellets 680 can be positioned inside the groove 624. For instance, in some cases, about 1 pound of ball bearing (BB) pellets 680 can be positioned in the groove 624.

Figure 6C:
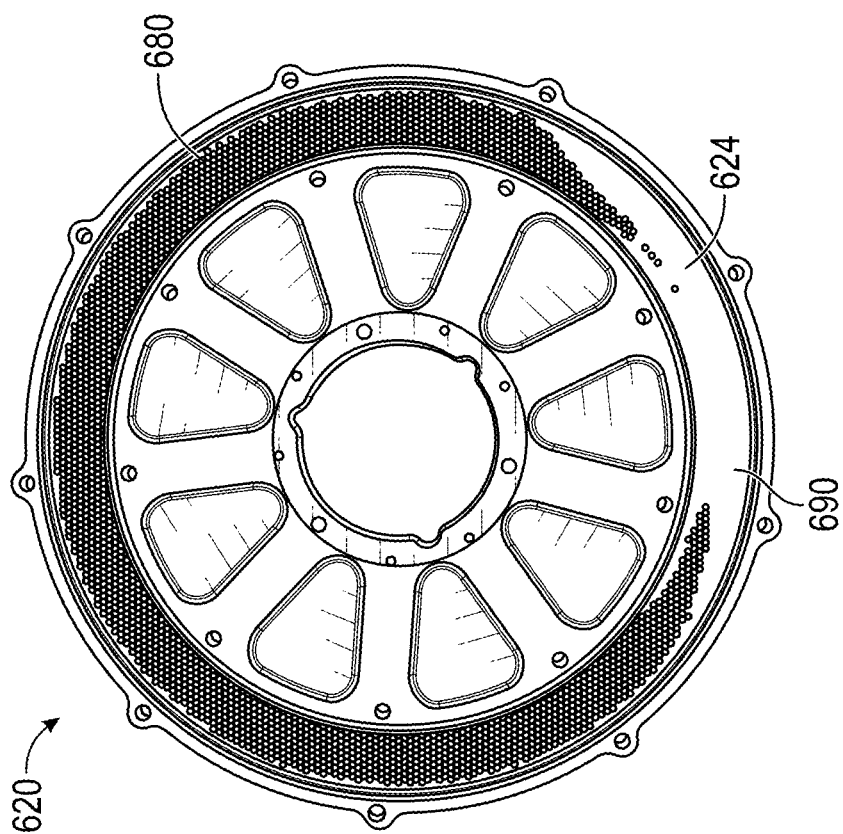
FIG. 6C illustrates the body shown in FIGS. 6A-6B with oil deposited in the groove.
Figure 6B:
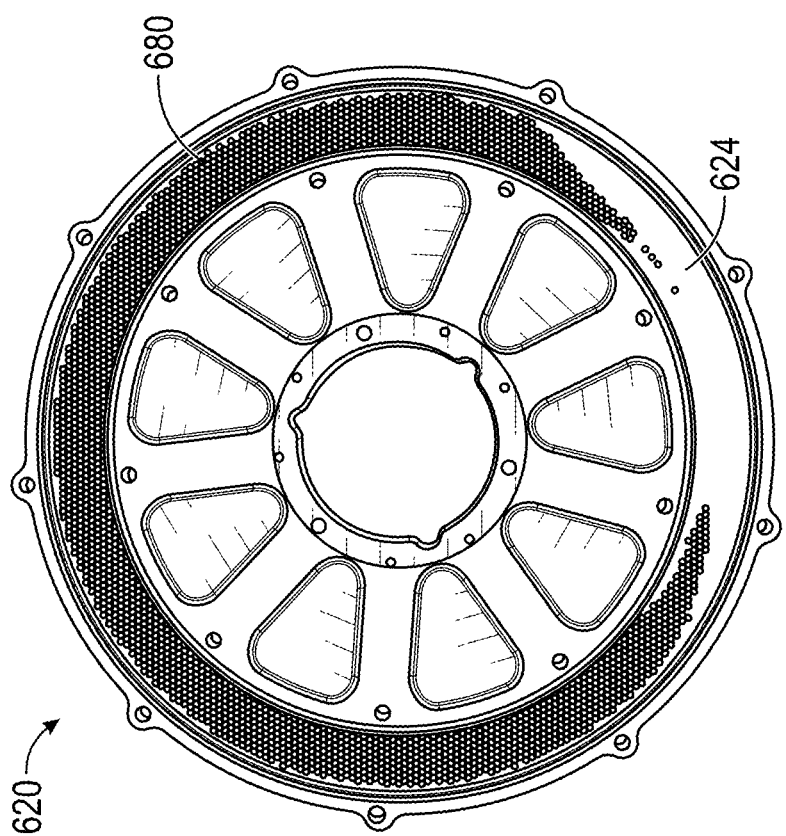
FIG. 6B illustrates the body shown in FIG. 6B with a plurality of ball bearing (BB) pellets positioned in the groove.
Figure 6D:
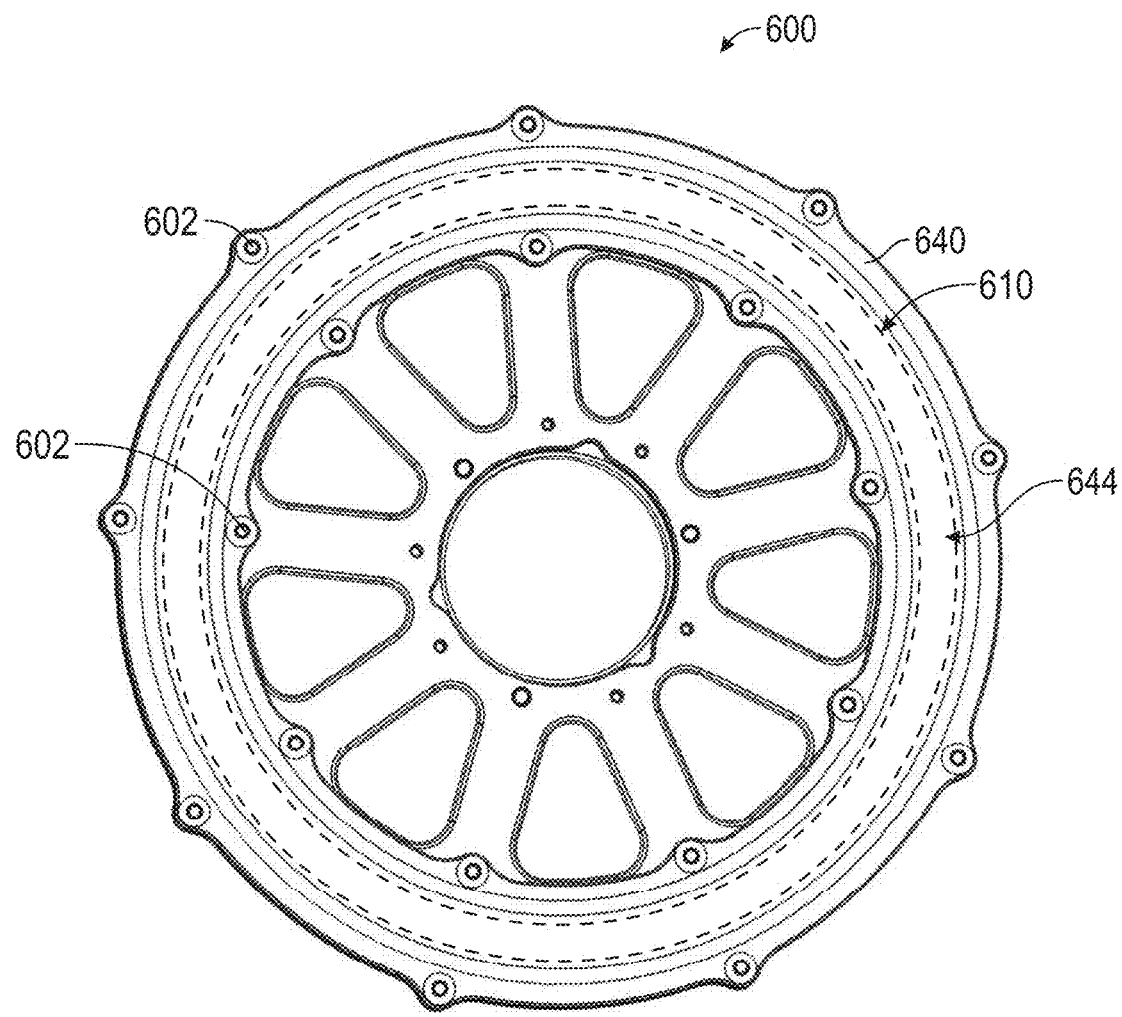
FIG. 6D illustrates a cap secured to the body shown in FIGS. 6A-6C.

The groove 624 can also be loaded with oil 690, as shown in FIG. 6C. The oil 690 can be added to the groove 624 before or after positioning the ball bearing (BB) pellets 680 in the groove 624. The oil 690 can be composed of petroleum distillates, including mineral oil (between about 60% and about 100%), mineral spirits (between about 10% and about 30%), tricresyl phosphate (between about 0.1% and about 1.0%), ortho-dichlorobenzene (between about 0.1% and about 1.0%), and/or para-dichlorobenzene (about <0.1%). In some cases, the oil 690 can be added after positioning the ball bearing (BB) pellets 680 in the groove 624. An entire volume of the groove 624 can be filled with ball bearing (BB) pellets 680 and/or oil 690. In some cases, the oil 690 can include heavy oil. Alternatively or additionally, any liquid (e.g., water) can be deposited in the groove 624.

The ball bearing (BB) pellets 680 and/or oil 690 can be sealed inside the chamber 610 formed by the groove 624 and the groove 644 of the cap 640. In some cases, the chamber can include a donut shape. As previously described herein, the body 620 and the cap 640 can be secured to each other via a plurality of screws 602. In some cases, the chamber can be sealed by one or more seals and/or gaskets. The one or more seals and/or gaskets can be positioned between the body 620 and the cap 640. For example, one or more O-rings 628 can be positioned along one or more grooves 629. The one or more or grooves 629 can be positioned along a rear face of the body 620. Sealing the ball bearing (BB) pellets 680 and/or oil 690 in the chamber formed by the groove 624 and the groove 644 can beneficially prevent the ball bearing (BB) pellets 680 and/or oil 690 from escaping the chamber in case of a collision.

When mounted to a wheel and/or an axle, the balancer hub assembly 600 formed by the body 620 and the cap 640, can provide active balancing (also referred herein to as self-balancing). For example, as the balancer hub assembly 600 spins with the wheel and/or the axle, each of the ball bearing (BB) pellets 680 may shift their position inside the chamber. Shifting of the ball bearing (BB) pellets 680 inside the chamber can allow the weight of the ball bearing (BB) pellets 680 to keep each tire balanced even as the tires wear out. The oil 690 can affect movement of the ball bearing (BB) pellets 680 inside the chamber. For instance, the oil 690 may allow movement of the ball bearing (BB) pellets 680 inside the chamber to replicate the movement of the wheel and/or the axle. Thus, under braking, the ball bearing (BB) pellets 680 may slow down and/or deaccelerate closer to the rate of deacceleration of the wheel and/or the axle. This can beneficially provide for more efficient and/or faster self-balancing.

In some cases, the ball bearing (BB) pellets 680 can be made of high-density materials that will not crack and/or come apart. The ball bearing (BB) pellets 680 can distribute weight evenly to counterbalance any heavy spots on a corresponding tire and/or wheel. The weight distribution can maintain balance, which is essential for a smooth and controlled ride, especially in racing cars.

Since the ball bearing (BB) pellets and/or oil are positioned inside a balancer hub assembly that can be installed and/or removed as needed, the balancer hub assembly provides a self-balancing solution that can be easily and quickly installed in a variety of cars and/or racing cars. In racing, the quick and easy installation of a balancer hub assembly can beneficially allow for more efficient stops and/or car set up.

The ball bearing (BB) pellets 680 and/or oil 690 can be included in any of the balancer hub assemblies described herein. For instance, the chamber formed by the groove 224 of the hub 220 and the groove 244 of the cap 240 can include ball bearing (BB) pellets 680 and/or oil 690.

Although certain embodiments and examples have been described herein, it will be understood by those skilled in the art that many aspects of the devices shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±1%, ±5%, ±10%, ±15%, etc.). For example, "about 12 inches" includes "12 inches." Phrases preceded by a term such as "generally" include the recited phrase and should be interpreted based on the circumstances (e.g., as much as reasonably possible under the circumstances). For example, "generally parallel" includes "parallel."

What is claimed is:

1. A balancer hub assembly for oval racing cars, the balancer hub assembly comprising:
    a hub comprising a front face, a rear face, a center bore, a groove on the rear face, and a center hub on the rear face;
    a cap comprising a front face, a rear face, and a groove on the front face, wherein the cap is removably couplable to the hub, and wherein the groove of the hub and the groove of the cap form a chamber when the hub and the cap are coupled to each other;
    a center cap removably couplable to the front face of the hub;
    a plurality of ball bearing (BB) pellets positioned inside the chamber;
    oil positioned inside the chamber;
    one or more O-rings positioned between the hub and the cap, wherein the one or more O-rings are configured to seal the plurality of ball bearing (BB) pellets and the oil inside the chamber; and
    a brake hub removably couplable to the center hub of the hub, wherein the brake hub is configured to receive and secure a brake assembly.

2. The balancer hub assembly of claim 1, further comprising a spindle removably couplable to the hub via a spindle nut extending through the center bore of the hub, wherein when the balancer hub assembly is secured to a wheel, the spindle is configured to allow rotation of a wheel.

3. The balancer hub assembly of claim 2, wherein the spindle is removably couplable to one or more steering arms, one or more tie rods, and a front axle of a racing car.

4. The balancer hub assembly of claim 1, further comprising:
    a first bearing race and a first bearing cone removably positioned in the center bore; and
    a second bearing race and a second bearing cone removably positioned in the center bore.

5. The balancer hub assembly of claim 4, wherein the first bearing race and the first bearing cone are spaced apart from the second bearing race and the second bearing cone respectively.

6. The balancer hub assembly of claim 1, wherein the plurality of ball bearing (BB) pellets comprise a tungsten material.

7. The balancer hub assembly of claim 1, wherein a total weight of the plurality of ball bearing (BB) pellets is between about 0.8 pounds and about 1.1 pound.

8. A balancer hub assembly for oval racing cars, the balancer hub assembly comprising:
    a hub comprising a groove;
    a cap comprising a groove and removably couplable to the hub, wherein the groove of the hub and the groove of the cap form a chamber when the hub and the cap are coupled to each other;
    a plurality of ball bearing (BB) pellets positioned inside the chamber;
    oil positioned inside the chamber; and
    one or more O-rings positioned between the hub and the cap, wherein the one or more O-rings are configured to seal the plurality of ball bearing (BB) pellets and the oil inside the chamber.

9. The balancer hub assembly of claim 8, wherein the hub further comprises a front face, a rear face, a center bore, and a center hub on the rear face, wherein the groove is positioned on the rear face.

10. The balancer hub assembly of claim 8, wherein the cap further comprises a front face, and a rear face, wherein the groove is positioned on the front face.

11. The balancer hub assembly of claim 8, further comprising a center cap removably couplable to the hub.

12. The balancer hub assembly of claim 8, further comprising a brake hub removably couplable to the hub, wherein the brake hub is configured to receive and secure a brake assembly.

13. The balancer hub assembly of claim 8, further comprising a spindle removably couplable to the hub, wherein when the balancer hub assembly is secured to a wheel, the spindle is configured to allow rotation of a wheel.

14. The balancer hub assembly of claim 13, wherein the spindle is removably couplable to one or more steering arms, one or more tie rods, and a front axle of a racing car.

15. The balancer hub assembly of claim 8, further comprising:
    a first bearing race and a first bearing cone removably positioned in a center bore of the hub; and
    a second bearing race and a second bearing cone removably positioned in the center bore of the hub;
    wherein the first bearing race and the first bearing cone are spaced apart from the second bearing race and the second bearing cone respectively.

16. A balancer hub assembly for oval racing cars, the balancer hub assembly comprising:
    a body comprising a front face, a rear face, a center bore, and a groove on the rear face;
    a cap comprising a front face, a rear face, and a groove on the front face, wherein the cap is removably couplable to the body, and wherein the groove of the body and the groove of the cap form a chamber when the body and the cap are coupled to each other;
a plurality of ball bearing (BB) pellets positioned inside the chamber;
oil positioned inside the chamber;
one or more O-rings positioned between the body and the cap, wherein the one or more O-rings are configured to seal the plurality of ball bearing (BB) pellets and the oil inside the chamber; and
a wheel spacer removably couplable to the front face of the body, wherein the wheel spacer comprises a center bore having a plurality of teeth;
wherein the plurality of teeth are configured to mesh with a plurality of corresponding splines of an axle to secure the balancer hub assembly to an oval racing car.

17. The balancer hub assembly of claim 16, wherein the plurality of ball bearing (BB) pellets comprise a tungsten material.

18. The balancer hub assembly of claim 16, wherein a total weight of the plurality of ball bearing (BB) pellets is between about 0.8 pounds and about 1.1 pound.

19. The balancer hub assembly of claim 16, wherein the balancer hub assembly is configured to be secured to a rear axle of the oval racing car.

20. The balancer hub assembly of claim 16, wherein the wheel spacer can be positioned between the cap and a suspension of the oval racing car.

* * * * *